(12) United States Patent
Kraft

(10) Patent No.: US 9,721,156 B2
(45) Date of Patent: Aug. 1, 2017

(54) GIFT CARD RECOGNITION USING A CAMERA

(71) Applicant: A9.com, Inc., Palo Alto, CA (US)

(72) Inventor: Adam Wiggen Kraft, Mountain View, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

(21) Appl. No.: 15/236,153

(22) Filed: Aug. 12, 2016

(65) Prior Publication Data

US 2016/0350591 A1    Dec. 1, 2016

Related U.S. Application Data

(63) Continuation of application No. 14/565,245, filed on Dec. 9, 2014, now Pat. No. 9,430,766.

(51) Int. Cl.
| | |
|---|---|
| *G06K 5/00* | (2006.01) |
| *G06K 9/00* | (2006.01) |
| *G06Q 20/34* | (2012.01) |
| *G06N 3/08* | (2006.01) |
| *G06N 7/00* | (2006.01) |

(Continued)

(52) U.S. Cl.
CPC ....... *G06K 9/00442* (2013.01); *G06K 9/3258* (2013.01); *G06K 9/342* (2013.01); *G06K 19/06* (2013.01); *G06N 3/08* (2013.01); *G06N 7/005* (2013.01); *G06Q 20/3276* (2013.01); *G06Q 20/342* (2013.01); *G06Q 20/3433* (2013.01); *G06Q 20/352* (2013.01);
(Continued)

(58) Field of Classification Search
CPC .......... G06K 9/00442; G06K 2209/01; G06K 9/3258; G06K 9/342; G06K 19/06; G06N 3/08; G06N 7/005; G06Q 20/3433; G06Q 20/352; G06Q 20/3276; G06Q 20/342; G06Q 20/387; G06F 3/017
See application file for complete search history.

(56) References Cited

U.S. PATENT DOCUMENTS

| 5,418,864 A | 5/1995 | Murdock et al. |
| 5,754,978 A | 5/1998 | Perez-Mendez et al. |

(Continued)

OTHER PUBLICATIONS

U.S. Non-Final Office Action dated Mar. 23, 2016 issued in U.S. Appl. No. 14/565,245.

(Continued)

*Primary Examiner* — Laura Gudorf
(74) *Attorney, Agent, or Firm* — Hogan Lovells US LLP

(57) ABSTRACT

Various embodiments describe systems and methods enable a computing device of a user to capture an image of a gift card, or other such monetary device containing a code, with a camera or otherwise receive an image of that gift card. The computing device can be configured to recognize codes, such as digit claim codes, of the gift card by using one or more image processing, computer vision, and/or machine learning algorithms. After a successful detection and verification of a claim code, money or funds deposited in, or otherwise available from, an account associated with the gift card can be utilized, such as applied to a purchase or deposited into the user's account. In many instances, a user interface (UI) can be provided on the computing device for the user to use to capture an image of a gift card and redeem the funds from the corresponding card.

20 Claims, 11 Drawing Sheets

(51) Int. Cl.

| | | |
|---|---|---|
| *G06Q 20/32* | (2012.01) | |
| *G06Q 20/38* | (2012.01) | |
| *G06K 19/06* | (2006.01) | |
| *G06K 9/32* | (2006.01) | |
| *G06K 9/34* | (2006.01) | |
| *G06F 3/01* | (2006.01) | |

(52) U.S. Cl.
CPC ......... *G06Q 20/387* (2013.01); *G06F 3/017* (2013.01); *G06K 2209/01* (2013.01)

(56) References Cited

U.S. PATENT DOCUMENTS

| | | | |
|---|---|---|---|
| 5,809,183 | A | 9/1998 | Serizawa et al. |
| 5,855,000 | A | 12/1998 | Waibel et al. |
| 6,026,177 | A | 2/2000 | Mong et al. |
| 6,256,408 | B1 | 7/2001 | Casey et al. |
| 6,351,574 | B1 | 2/2002 | Yair et al. |
| 6,668,074 | B1 | 12/2003 | Wilson |
| 6,671,404 | B1 | 12/2003 | Kawatani et al. |
| 6,731,788 | B1 | 5/2004 | Agnihotri et al. |
| 7,240,062 | B2 | 7/2007 | Andersen et al. |
| 7,650,035 | B2 | 1/2010 | Vincent et al. |
| 7,742,642 | B2 | 6/2010 | Goldstein |
| 8,009,928 | B1 | 8/2011 | Manmatha et al. |
| 8,060,609 | B2 | 11/2011 | Banger et al. |
| 8,139,894 | B2 | 3/2012 | Nestares |
| 8,175,388 | B1 | 5/2012 | Fisher |
| 8,644,610 | B1 | 2/2014 | Ramkumar et al. |
| 8,831,329 | B1 | 9/2014 | Kumar et al. |
| 9,043,349 | B1 | 5/2015 | Lin et al. |
| 2002/0051575 | A1 | 5/2002 | Myers et al. |
| 2002/0054693 | A1 | 5/2002 | Elmenhurst |
| 2003/0037097 | A1 | 2/2003 | Meyer et al. |
| 2003/0208502 | A1 | 11/2003 | Lin |
| 2003/0225686 | A1 | 12/2003 | Mollett et al. |
| 2004/0057619 | A1 | 3/2004 | Lim et al. |
| 2004/0262378 | A1 | 12/2004 | Ooki |
| 2005/0060273 | A1 | 3/2005 | Andersen et al. |
| 2005/0180632 | A1 | 8/2005 | Aradhye et al. |
| 2005/0240407 | A1 | 10/2005 | Simske et al. |
| 2006/0064177 | A1 | 3/2006 | Tian et al. |
| 2006/0120629 | A1 | 6/2006 | Myers et al. |
| 2006/0212856 | A1 | 9/2006 | Simske et al. |
| 2006/0271847 | A1* | 11/2006 | Meunier ............ G06K 9/00469 715/205 |
| 2006/0285746 | A1 | 12/2006 | Yacoub et al. |
| 2007/0257934 | A1 | 11/2007 | Doermann et al. |
| 2007/0286486 | A1 | 12/2007 | Goldstein |
| 2008/0063279 | A1 | 3/2008 | Vincent et al. |
| 2008/0101726 | A1 | 5/2008 | Myers et al. |
| 2008/0273807 | A1 | 11/2008 | Dauw et al. |
| 2009/0060352 | A1 | 3/2009 | Distante et al. |
| 2009/0070110 | A1 | 3/2009 | Erol et al. |
| 2009/0070415 | A1 | 3/2009 | Kishi et al. |
| 2009/0074300 | A1 | 3/2009 | Hull et al. |
| 2009/0100050 | A1 | 4/2009 | Erol et al. |
| 2009/0125510 | A1 | 5/2009 | Graham et al. |
| 2009/0177758 | A1 | 7/2009 | Banger et al. |
| 2010/0042523 | A1 | 2/2010 | Henry et al. |
| 2010/0080493 | A1 | 4/2010 | McGatha et al. |
| 2010/0102119 | A1 | 4/2010 | Gustin et al. |
| 2010/0166339 | A1 | 7/2010 | Gokturk et al. |
| 2010/0329574 | A1 | 12/2010 | Moraleda et al. |
| 2011/0035662 | A1 | 2/2011 | King et al. |
| 2011/0099571 | A1 | 4/2011 | Lucas |
| 2011/0255794 | A1 | 10/2011 | Neogi et al. |
| 2012/0012648 | A1 | 1/2012 | Collins et al. |
| 2012/0030103 | A1 | 2/2012 | Hughes et al. |
| 2012/0059914 | A1 | 3/2012 | Banger et al. |
| 2012/0063686 | A1 | 3/2012 | Dauw et al. |
| 2012/0092329 | A1 | 4/2012 | Koo et al. |
| 2012/0143760 | A1* | 6/2012 | Abulafia ............ G06K 9/2054 705/44 |
| 2012/0163718 | A1 | 6/2012 | Reddy |
| 2012/0179468 | A1 | 7/2012 | Nestares |
| 2012/0245835 | A1 | 9/2012 | Weitz et al. |
| 2012/0310643 | A1 | 12/2012 | Labsky et al. |
| 2013/0031450 | A1 | 1/2013 | Reese |
| 2013/0218886 | A1 | 8/2013 | Graham et al. |
| 2013/0231852 | A1 | 9/2013 | Weitz et al. |
| 2013/0330003 | A1 | 12/2013 | Ivanchenko et al. |
| 2013/0346431 | A1 | 12/2013 | Erol et al. |
| 2014/0009612 | A1* | 1/2014 | King ............ B66F 9/0755 348/143 |
| 2014/0169678 | A1 | 6/2014 | Chulinin |
| 2014/0193075 | A1 | 7/2014 | Pavani et al. |
| 2014/0195384 | A1 | 7/2014 | Hamilton et al. |
| 2014/0219561 | A1 | 8/2014 | Nakamura |
| 2014/0355835 | A1 | 12/2014 | Rodriguez-Serrano et al. |
| 2015/0254507 | A1 | 9/2015 | Lin et al. |
| 2016/0098611 | A1 | 4/2016 | Gray et al. |

OTHER PUBLICATIONS

U.S. Notice of Allowance dated May 12, 2016 issued in U.S. Appl. No. 14/565,245.
U.S. Final Office Action dated Jun. 15, 2016 issued in U.S. Appl. No. 13/929,689.
U.S. Non-Final Office Action dated Nov. 9, 2015 issued in U.S. Appl. No. 13/929,689.
U.S. Notice of Allowance dated Feb. 6, 2015 issued in U.S. Appl. No. 13/688,772.
Songhua Xu et al.—"Boosting text extraction from biomedical images using text region detection"—Published in: Biomedical Sciences and Engineering Conference (BSEC), 2011—Date of Conference: Mar. 15-17, 2011 pp. 1-4.
A conclusive methodology for rating OCR performance—Nathan E. Brener, S.S. Iyengar and O.S. Pianykh Article first published online: Jul. 26, 2005 Journal of the American Society for Information Science and Technology vol. 56, Issue 12, pp. 1274-1287, Oct. 2005.
U.S. Non-Final Office Action dated Mar. 12, 2014 issued in U.S. Appl. No. 13/688,772.
U.S. Final Office Action dated Sep. 8, 2014 issued in U.S. Appl. No. 13/688,772.
U.S. Non-Final Office Action dated Oct. 15, 2015 issued in U.S. Appl. No. 14/721,696.
U.S. Notice of Allowance dated Mar. 17, 2016 issued in U.S. Appl. No. 14/721,696.
Bindu Philip & R. D Sudhaker Samuel—"A Novel Bilingual OCR System based on Column—Stochastic Features and SVM Classifier for the Specially Enabled"—Published in: Emerging Trends in Engineering and Technology (ICETET), 2009 2nd International Conference on—Date of Conference: Dec. 16-18, 2009—pp. 252-257.
Hankyu Lim & Ungmo Kim—"Word Recognition by Morphological Analysis"—Published in: Intelligent Information Systems, 1995. ANZIIS-95. Proceedings of the Third Australian and New Zealand Conference on—Date of Conference: Nov. 27, 1995—Conference Location :Perth, WA—pp. 236-241.
U.S. Non-Final Office Action dated Dec. 16, 2014 issued in U.S. Appl. No. 14/105,028.
U.S. Notice of Allowance dated Apr. 1, 2015 issued in U.S. Appl. No. 14/105,028.
U.S. Non-Final Office Action dated Sep. 25, 2015 issued in U.S. Appl. No. 14/816,943.
U.S. Notice of Allowance dated May 19, 2016 issued in U.S. Appl. No. 14/816,943.
U.S. Non-Final Office Action dated Apr. 23, 2015 issued in U.S. Appl. No. 13/842,433.
U.S. Notice of Allowance dated Oct. 5, 2015 issued in U.S. Appl. No. 13/842,433.

\* cited by examiner

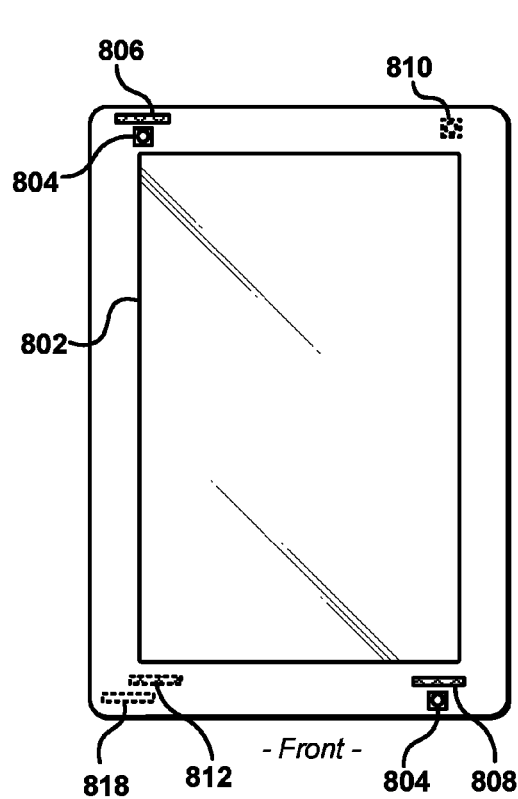
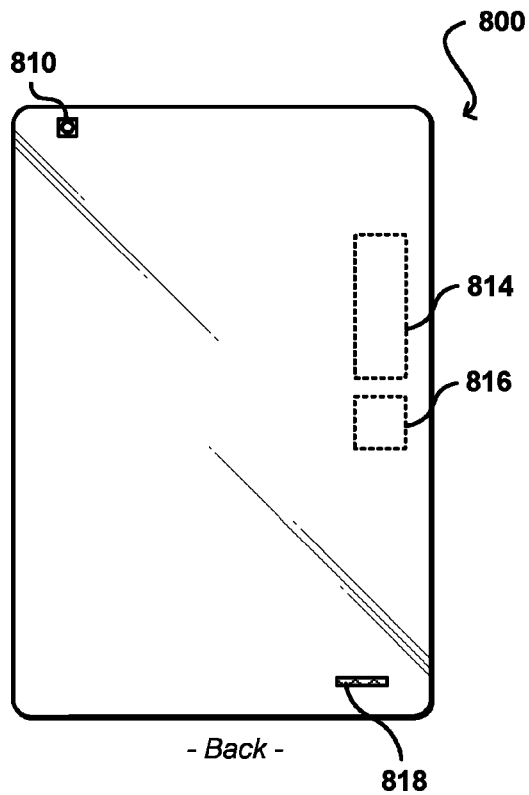
FIG. 8A   FIG. 8B
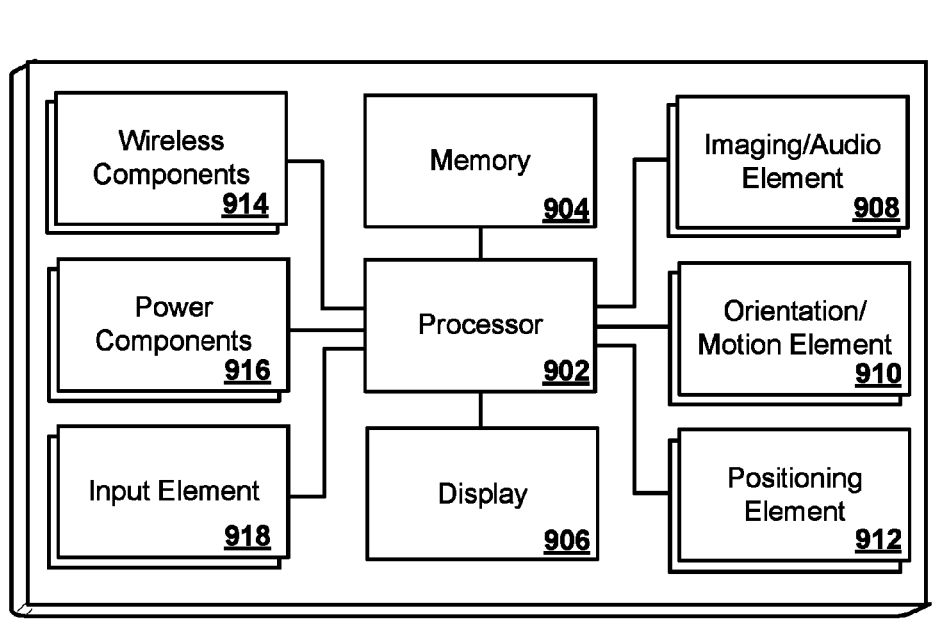
FIG. 9

GIFT CARD RECOGNITION USING A CAMERA

CROSS-REFERENCES TO RELATED APPLICATIONS

This application is a continuation of U.S. application Ser. No. 14/565,245, entitled "GIFT CARD RECOGNITION USING A CAMERA," filed Dec. 9, 2014; which is incorporated herein by reference for all purposes.

BACKGROUND

Gift cards and stored value cards have gained increasing popularity among users. A gift card can be a safe and convenient way to handle and does not require carrying cash and loose changes. A gift card is generally referred to cards that money is deposited or activated in an associated account before any use of the card is allowed.

However, when a user receives a gift card, it a cumbersome task for the user to enter digit claim codes of a gift card into a web browser or an app of a mobile device. Therefore, there is a need to recognize a gift card without requiring a user to manually input claim codes associated with the gift card.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 8A and 8B illustrate an example computing device that can be used to implement aspects of the various embodiments;

FIG. 9 illustrates example components of a computing device such as that illustrated in FIG. 8, in accordance with various embodiments.

DETAILED DESCRIPTION

Figure 1:
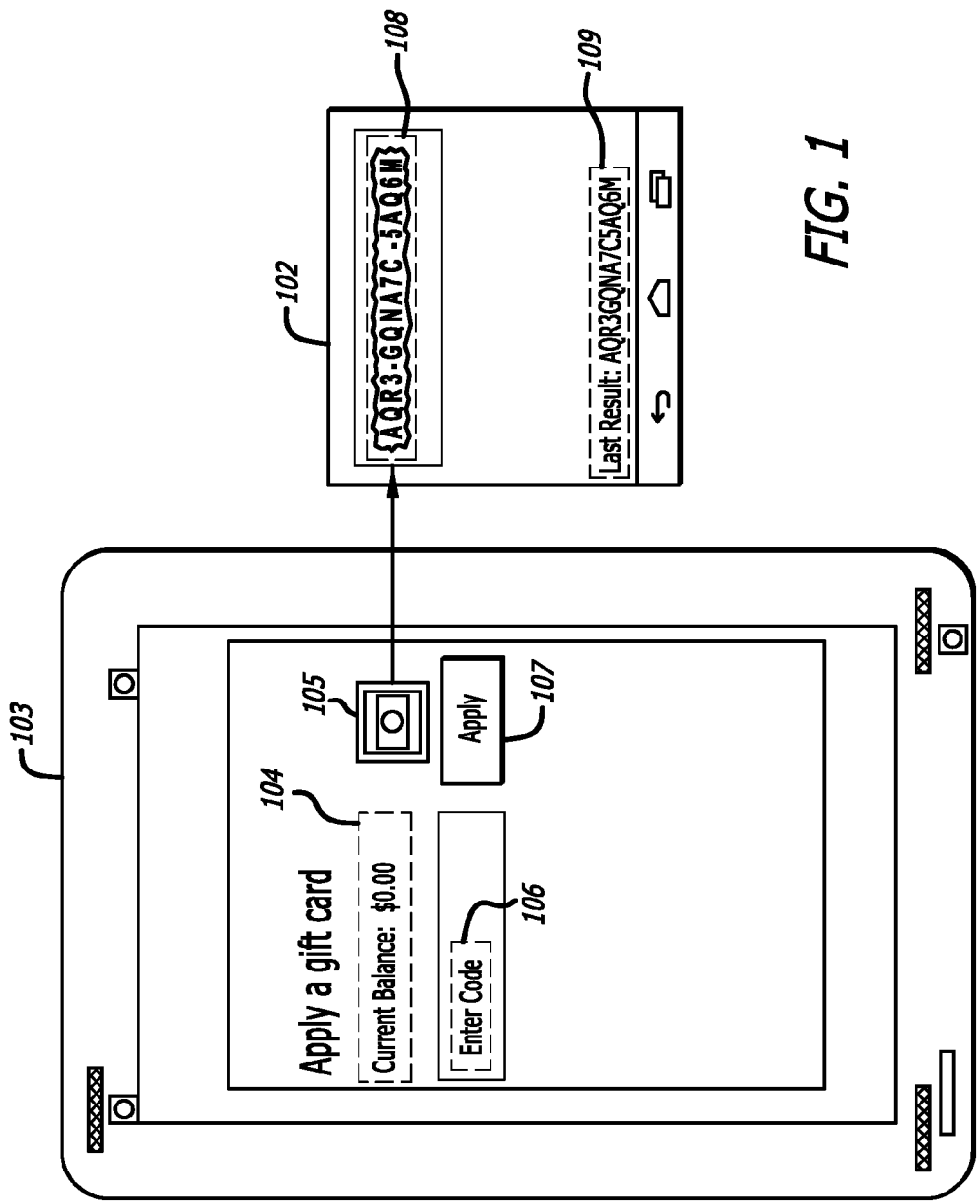
FIG. 1 illustrates an example user interface for gift card recognition in accordance with various embodiments.

Systems and methods in accordance with various embodiments of the present disclosure overcome one or more of the above-referenced and other deficiencies in conventional approaches to recognizing, applying, or otherwise processing claim codes of gift cards or other such monetary devices. In particular, various embodiments enable a computing device of a user to capture an image of a gift card, or other such monetary device containing a code, with a camera or otherwise receive an image of that gift card. The computing device can be configured to recognize codes, such as digit claim codes, of the gift card by using one or more image processing, computer vision, and/or machine learning algorithms. After a successful detection and verification of a claim code, money or funds deposited in, or otherwise available from, an account associated with the gift card can be utilized, such as applied to a purchase or deposited into the user's account. In many instances, a user interface (UI) can be provided on the computing device for the user to use to capture an image of a gift card and redeem the funds from the corresponding card.

In some embodiments, claim codes of a gift card can be recognized by using two or more character recognition subtasks of a first-pass pipeline. The character recognition subtasks of the first-pass pipeline may include receiving an image of a gift card, binarizing the received image, selecting one or more character patches, grouping character patches, classifying characters by using one or more machine learning algorithms, and determining claim codes of the gift card. In response to no claim code being found by the character recognition subtasks in the first-pass pipeline, two or more subtasks of a second-pass pipeline can be used to recognize the claim codes of the gift card. The subtasks in the second-pass pipeline may include rotating groups of character patches along a baseline, performing a first close cut of grouped character patches based upon X-Gradient information, performing a second close cut of the grouped character patches based upon Y-Gradient information, classifying the grouped character patches into claim code characters by using the one or more machine learning algorithms, and determining the claim codes of the gift card. In some embodiments, character patches and claim code characters can be detected by an optical character recognition (OCR) engine. In some instances, a confidence score can be assigned to each detected character. The confidence score is a probability associated with the accuracy of the detected character.

Some embodiments provide recognized claim codes of a gift card on a user interface of a computing device for a user to compare with actual claim codes of the gift card and confirm by applying the recognized claim codes. For example, recognized claim codes can be paused on the user interface below or above a location corresponding to actual claim codes in a received gift card image. In some implementations, multiple images of a gift card can be taken for claim code recognition. Claim codes determined in individual images can be automatically compared and verified. In some implementations, only image regions used in claim code recognition are displayed on the user interface of the computing device while other regions are grayed out.

At least some embodiments use various preprocessing techniques to process a received image of a gift card. A processing component may preprocess the received image to detect a claim code region. For example, the processing component can implement algorithms that detect and recognize at least one of: types of the gift card, locations of claim codes in the image, or regions of the image most likely to find claim codes. In some embodiments, an indication can be provided for a user to zoom in on a specific region of the gift card. For instances, an example of claim codes can be provided to the user according to the type of the gift card so that the user can scan a corresponding region of the gift card. Types of gift card may be determined based upon one of a specific theme of the gift card, specific name, or specific characters associated with claim codes. In some embodiments, objectives of preprocessing may further include noise reduction, normalization of the received image, and compression in the amount of information to be retained.

In some embodiments, claim codes of various gift cards can be collected and used to train one or more machine learning algorithms. The one or more machine learning algorithms may include, but are not limited to, at least one of neural network model, support vector machine based model, Bayesian statistics, case-based reasoning, decision trees, inductive logic programming, Gaussian process regression, linear regression, group method of data handling, learning automata, random forests, ensembles of classifiers, ordinal classification, or conditional random fields. In some implementations, a neural network model can have two or more hidden layers with suitable units to capture a complex correlation among claim codes and other characters presented on a gift card. The neural network model can be used to machine-learn parameter weights (Theta) of collected claim codes. In response to a new set of claim code samples being collected, the neural network model can be used to process the new set of samples to readjust and refine parameter weights of the neural network model.

FIG. 1 illustrates an example user interface for gift card recognition in accordance with various embodiments. In this example, a computing device 103 is used to take an image of a gift card 102 and redeem any or all balance remaining with respect to the card. Although the computing device 103 is shown as a mobile phone in FIG. 1, it should be understood that various types of electronic or computing device that capable of receiving and/or processing images in accordance with various embodiments discussed herein. These computing devices can include, for example digital cameras, desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of processing data, or a combination of any two or more of these. The computing device may use operating systems that include, but are not limited to, Android, Berkeley Software Distribution (BSD), iPhone OS (iOS), Linus, OS X, Unix-like Real-time Operating System (e.g., QNX), Microsoft Windows, Window Phone, and IBM z/OS. The computing device 103 may have or be coupled to one or more image capture elements, such as one or more cameras or camera sensors, to capture images and/or videos. The one or more image capture elements may include a charge-coupled device (CCD), an active pixel sensor in complementary metal-oxide-semiconductor (CMOS) or N-type metal-oxide-semiconductor (NMOS), an infrared or ultrasonic image sensor, or an image sensor utilizing other type of image capturing technologies. The computing device 103 may have one or more audio capture devices capable of capturing audio data (e.g., ambient sound, a song, or word commands from a user).

When a user is ready to redeem the gift card 102, a user interface can be provided that includes a first element 106 enabling the user to either manually enter a claim code and a second element 105 for enabling the user to cause the device to capture an image of the gift card for the computing device 103 to recognize. In this example, the gift card 102 includes a claim code 108 with 15 digits, AQR3-GQNA7C-5AQ6M. The computing device 103 can recognize the claim codes by processing the image of the gift card 102. In some embodiments, an image of the card can be preprocessed for speed and efficiency of claim code recognition. For instance, the location of claim codes can be detected to save processing time on image regions containing no claim codes. Once the claim codes are recognized by the computing device 103, the camera session 105 may be stopped. The user can then apply 107 the claim codes and/or redeem current balance 104 of the gift card 102.

In some implementations, the back of a gift card may contain various numbers and characters such as phone numbers, bar codes, UPC number, and claim codes. However, claim codes are typically located in an area associated with a specific mark or box depending on a theme of the card, or entity issued the card. Preprocessing of a received gift card image can be used to point to specific locations or rule out certain areas of the gift card for speed and efficiency of claim code recognition. For instances, a string has both an "@" sign and a period may indicate an email address while a string with three characters and one period may indicate a URL address. In this example, claim codes 108 are located in a specific rectangular region on the back of the gift card 102. Some embodiments provide an example of claim codes on a user interface based upon a preprocessing result of the received gift card image so that the user can scan a corresponding region of the gift card.

In some embodiments, an indication may be provided on a user interface so that a user can zoom in on a particular region associated with claim codes of the gift card 102. For instances, coating material covering claim codes of gift cards often needs to be scratched off or removed to reveal the claim codes. The coating material may be poorly scratched off therefore interfere with the claim code recognition such that images of characters associated with the claim codes do not have enough pixels for claim code recognition. A zoomed-in image to claim code areas of the gift card can help reduce claim code recognition time and improve recognition accuracy, hence improve user experience.

Some embodiment can prompt the user to take multiple images of the gift card 102. Claim codes recognized from different images can be compared and used for verification purposes. In some instances, recognized claim codes 109 can be shown on the user interface of the computing device for the user to compare with the actual claim codes 108. If the recognized claim codes 109 are correct, the user can confirm and apply the claim codes.

Figure 2:
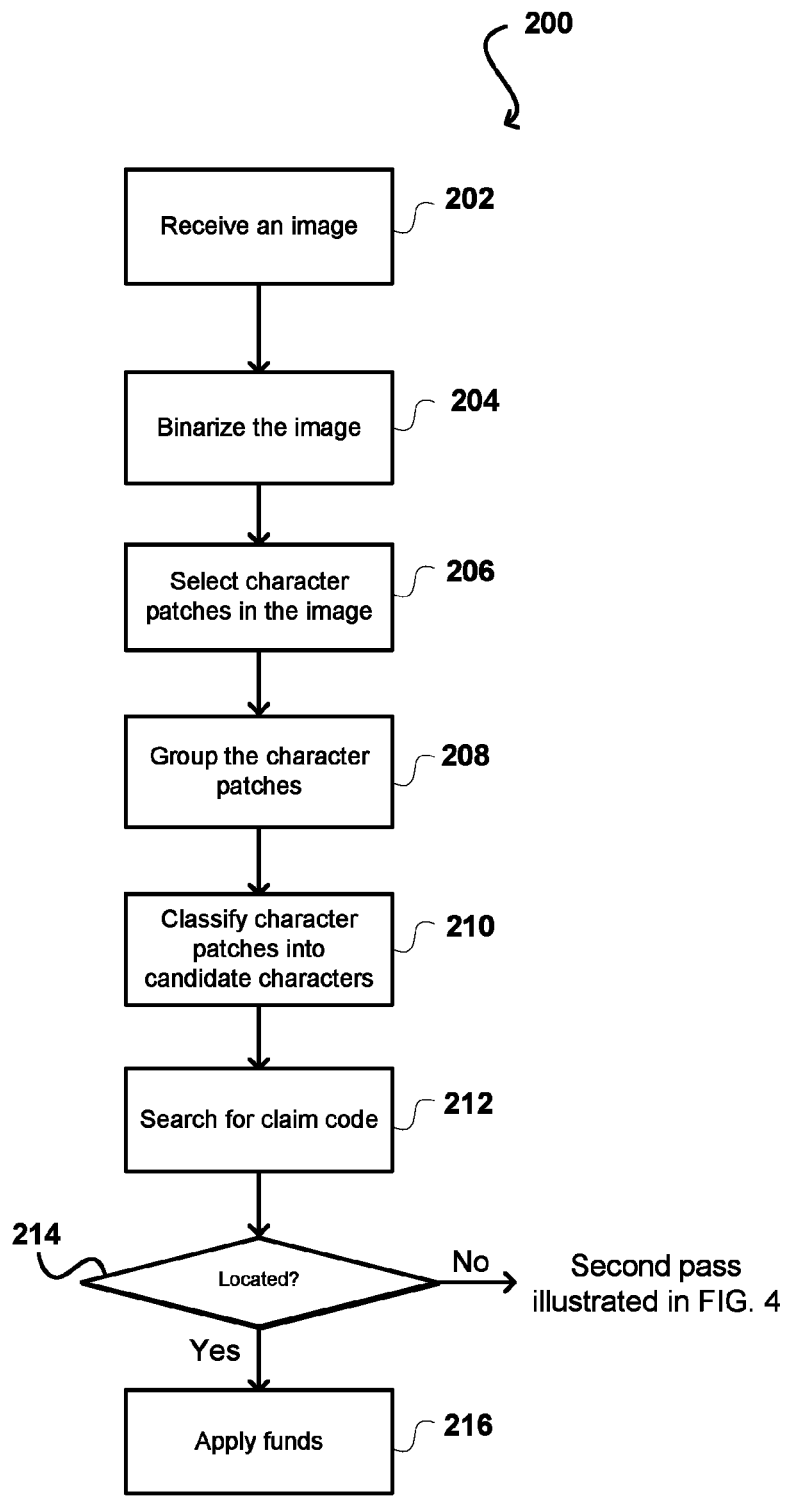
FIG. 2 illustrates an example of a flow diagram illustrating character recognition subtasks of a first-pass pipeline for recognizing claim codes of a gift card in accordance with various embodiments.

FIG. 2 illustrates an example of a flow diagram illustrating character recognition subtasks of a first-pass pipeline 200 for recognizing claim codes of a gift card in accordance with various embodiments. It should be understood that there can be additional, fewer, or alternative steps performed in similar or alternative orders, or in parallel, within the scope of the various embodiments unless otherwise stated. The first-pass pipeline 200, or any other process described herein or variations and combinations thereof, may be performed on a computing device capable of receiving input from or providing output to a user in accordance with various embodiments discussed herein. By way of examples, the devices can include a desktop computer, a portable computer, a tablet computer, a mobile phone, a wearable computer (e.g., a watch or glasses), or a combination of two or more of these.

Figure 3A:
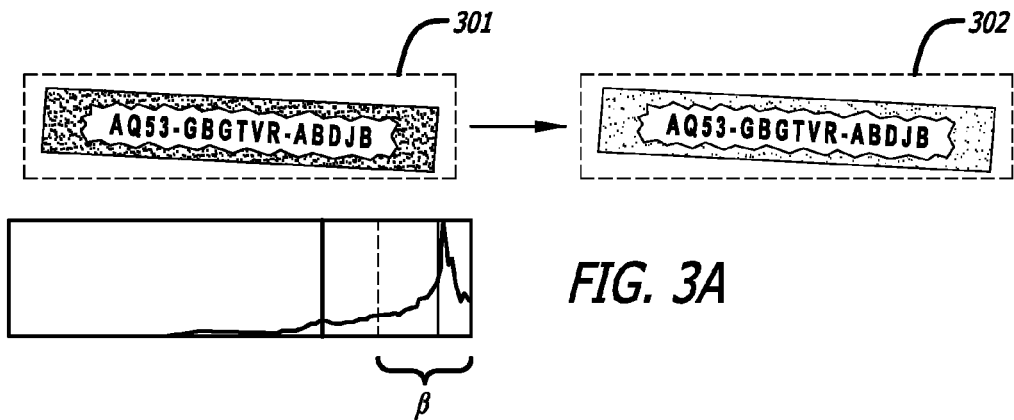
FIGS. 3A-3F illustrate examples of character recognition subtasks in a first-pass process for recognizing claim codes in a received image in accordance with various embodiments.
Figure 3B:
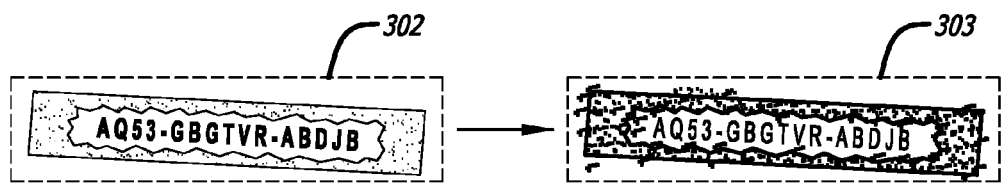

In this example, the first-pass pipeline 200 begins by receiving an image 202 of a gift card. The image can be a specific region of the gift card containing claim codes or an image of the entire gift card. The received image is then binarized at 204. In some embodiments, the received image can be binarized by using one or more binarization methods that include an Otsu method, contrast adaptive method, light-weight text image processing method, noise-attribute-thresholding method, threshold selection method, Niblack method, Sauvola method, and Christian method. For example, a received image is saturated by adding a fixed value (e.g., 255) that can be an Otsu threshold multiplied by a random value (e.g., a value r between 0 and 1). For example, $I=I+r\beta$, where $\beta$ is an Otsu threshold. An adaptive threshold and an optional dilate and erode stage can be run on the saturated image to come up with a binarized image that is suitable for determining character regions. Examples of a saturation subtask and adaptive threshold subtask are illustrated in FIG. 3A and FIG. 3B, respectively. In FIG. 3A, a received image of claim codes 301, "AQ53-GBGTVR-ABDJB," is saturated by adding a fixed value (i.e., 255) to come up with a saturated image of claim codes 302. A binarized image 303 can then be determined by running an adaptive threshold process and a post-process dilate and erode on the saturated image of claim codes 302.

Figure 3C:
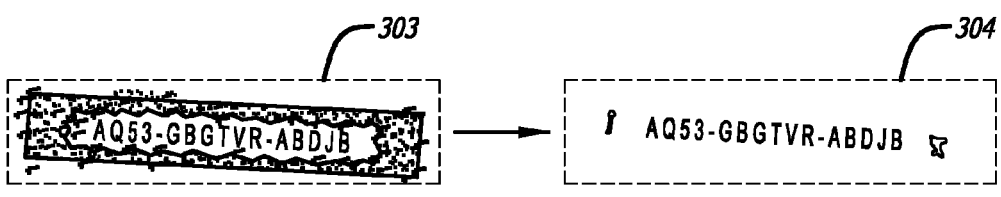

Characters-like regions in the binarized image can be determined at select character patches 206. In some embodiments, character-like regions can be detected by running connected components to filter out non-relevant regions. For instances, small regions or regions that are too skewed can be filtered out. In some embodiments, non-relevant regions can be removed according to one or more machine-learning algorithms or other suitable algorithms. FIG. 3C illustrates an example of determining one or more character-like patches 304 by selecting character patches from the binarized image 303.

In some embodiments, selected characters patches may include, but are not limited to, maximally stable extremal regions (MSERs), Harris-affine regions, Hessian-affine regions, Kadir-Brady saliency (KBS) regions, edge-based regions (EBR) regions, and intensity extrema and salient regions. For example, an extremal region is a set of connected pixels that have grayscale values above a threshold and has a size that does not change significantly when the threshold varies above the threshold value. In addition, an extremal region can contain most of the edge intensity found by computing a gradient image beforehand. Character patches that either have too many or too few pixels, and any MSER whose aspect ratio is too different from normal character or which has more than three child regions, can be ignored. It should be understood that various types of character patches may also be identified via characteristic points making correspondences between textures, objects and panoramas in an image in accordance with various embodiments of the present technology. For example, Harris-affine regions are a set of similar areas taken from different viewpoints that are related by a simple geometric transformation, such as scaling, rotation and shearing. For another example, Hessian-affine regions can be defined by using extracted features to infer the contents of the features. For yet another example, KBS regions can be defined as areas with distinct and representative feature(s).

Figure 3D:
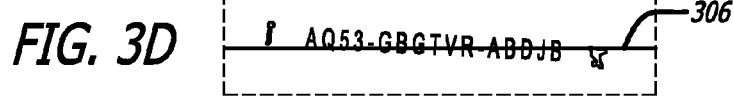

Selected character patches in the binarized image are grouped along baselines at group character patches 208. Baselines in a particular aligned direction (e.g., a vertical aligned direction) can be determined by one or more line finding algorithms and used to group selected character patches. For instances, character patches along a specific baseline and/or having similar sizes or aspect ratios can be grouped together into a particular group of character patches. FIG. 3D illustrates an example of grouping character patches 305 along a specific baseline 306. In some instances, one or more grouped character patches may be partially overlapped.

At classify characters 210, grouped character patches in the binarized image can be classified into claim code characters by using one or more machine learning algorithms. In some embodiments, one or more neural network models are used to classify grouped character patches into claim code characters. The neural network model can have two or more hidden layers with suitable units to capture a complex correlation among claim codes and other characters presented on a gift card. The neural network model can be used to machine-learn parameter weights (Theta) of collected claim codes. In some embodiments, images of these collected claim codes may be captured with various lighting, positions and noises (e.g., from scratched-off coding material), and have various appearances (e.g., fonts, heights, thickness, spacing and sizes). In response to a new set of claim code samples being collected, the neural network model can be used to process the new set of claim code samples to readjust and refine parameter weights of the neural network model. Each node of the one or more hidden layers may take input data, perform an operation on the data, and selectively pass results to other nodes of the one or more hidden layers. The output of each node is called its activation. Weight values associated with each node constrain how input data are related to output data of the corresponding node. Weight values of each node can be determined by iterative flows of training data through the neural network. For instances, activations of the one more hidden layers may be generated using a sigmoid function and an activation of the output layer may be generated by using a linear function (i.e., a perceptron output). Once trained, the neural network can be used to process grouped character patches in the binarized image.

In some embodiments, a convolutional neural network can be used to classify grouped character patches into claim code characters. Claim code characters in the grouped character patches can be captured under various conditions (e.g., lighting, position and noise). The convolutional neural network may include local or global pooling layers, which combine the outputs of neuron clusters. The local or global pooling layers also comprise of various combinations of convolutional layers and fully connected layers, with point-wise nonlinearity applied at the end of or after each layer. In some implementations, the convolutional neural network use shared weight in convolutional layers. The same filter (weights bank) can be used for each pixel in each of the convolutional layers, which reduces required memory size and improves performance. Although only some machine learning algorithms are discussed herein, it should be understood that various other type of machine learning algorithms that are capable of analyzing various claim codes and classifying character patches into characters can be used in accordance with various embodiments discussed herein.

In some embodiments, classify characters 210 may further include extracting features from each grouped character patches, the features including: Bounding Box Aspect Ratio (width over height), Compactness (4 pi times area over perimeter squared), Raw Compactness (4 pi times number of pixels over perimeter squared), Stroke Width (estimated using distance transform) divided by width, Stroke Width (estimated using distance transform) divided by height, Solidity (area over bounding box area), Convexity (convex hull perimeter over perimeter), and Number of Holes (e.g., a 'b' has 1 hole, a 'B' has 2 holes, a 'T' has 0 holes). A fixed set of features can be selected and used to train a classifier using a machine learning algorithm such as a support vector machines (SVM) or AdaBoost. A classifier can be used to reject most non-characters from the list of characters, and an operating point on the receiver operating characteristic (ROC) curve can be chosen so that most characters are detected (i.e., a low false negative rate), but with a high false positive rate.

In some embodiments, pair finding can include sorting candidate characters in grouped character patches left to right, and all pairs that pass a test can be considered a possible claim code character. The test compares the distance between candidate characters, vertical overlap of two candidate characters, their relative height, width, stroke width, and intensity. Claim code character line finding, in accordance with at least one embodiment, can further include treating each candidate character as a vertex in a graph and each pair as an edge, then using an iterative dynamic programming algorithm to extract the best (e.g., the longest) sequence of edges, where the longest edges become claim code candidates. Additionally or alternatively, claim code character line finding can include selecting candidate characters from left to right after three candidate characters are found to be in a good sequence.

In at least one embodiment, base line estimation can include estimating the slope of the baseline using a clustering algorithm and computing intercepts that minimize the minimum distance between baselines and candidate characters. Each claim code candidates can have at least two lines in the top and bottom points of the candidate characters, and if two or more claim code candidates appear to have the same baselines, they can be merged and the lines can be re-estimated. In some embodiments, candidate characters refinement can be performed after baseline estimation is performed, where all candidate characters that are classified as non-text, but fit into the baseline configuration, are included. Claim code candidates splitting can further include estimating the spaces between candidate characters in each baseline and choosing a threshold, where any gap between characters greater than that threshold or certain specific characters (e.g., "-" or ".") can be considered to be a claim code boundary and can be marked as such.

Figure 3E:
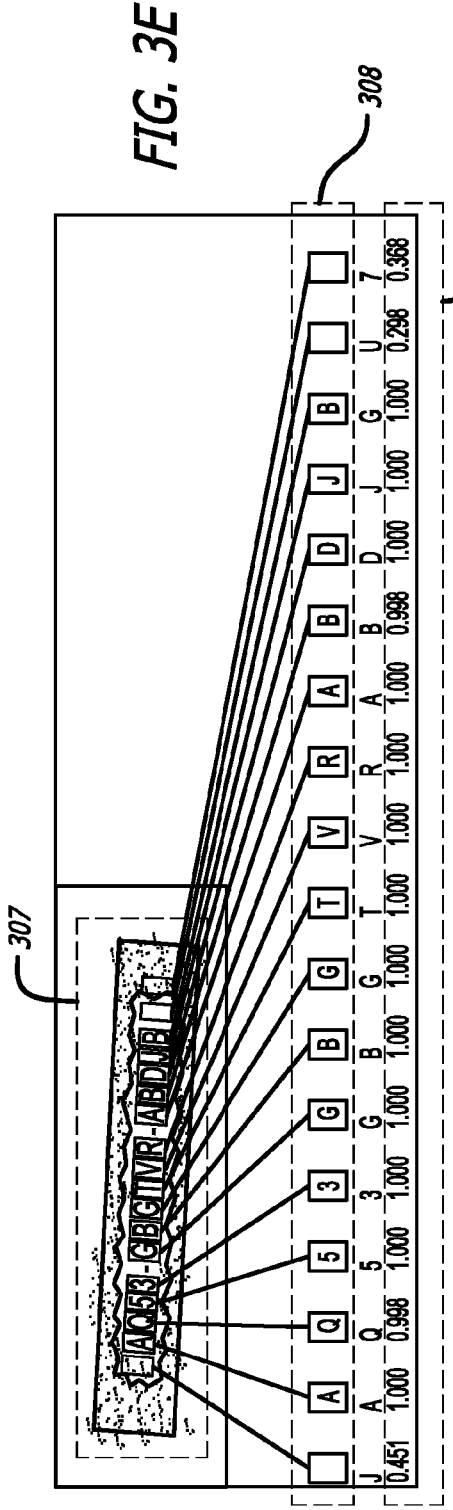

FIG. 3E illustrates an example of claim code characters 307 recognized by using one or more machine learning algorithms. In this example, recognized characters 307 includes a list of characters "JAQ53GBGTVRABDJBU7" 308 and confidence scores 309 associated with the recognized characters. In some embodiments, confidence scores may be determined by a trained classifier, an optical character recognition (OCR) engine, or a confidence module corresponding to the OCR engine. The confidence score can be a probability associated with the accuracy of the recognized characters by the character recognition engine or OCR engine. A confidence score associated with each recognized character may be determine by taking into account various attributes of ordinary characters. For example, determining a pattern of detected characters corresponding to previously collected claim codes can increase the confidence score for the detected characters. For another example, if detected characters are determined to have incoherent patterns, such as high frequency of repeating the same character and the like, the incoherent patterns can decrease the confidence score for the detected characters. In some embodiments, a trained classifier can be trained by using a number of collected images containing claim codes that were captured under various lighting, positions and noises (e.g., partially scratched-off coding material), and having various appearances (e.g., fonts, heights, thickness, spacing and sizes).

In some embodiments, the OCR engine or the confidence module may include a conversion table that is generated based on the statistical analysis of comparing testing results against the ground truth of one or more training sets of known claim codes. The conversion table can be used to estimate the confidence score for future unknown claim codes of a received gift card image.

Many other methods may also be used to detect claim code character and estimate confidence scores for detected characters. Various techniques (e.g., OCR and other character recognition processes) can be used as the primary image and text analysis technique or to enhance other processes. Some techniques are described in co-pending U.S. patent application Ser. No. 13/929,689, filed Jun. 27, 2013, entitled "METHOD AND SYSTEM FOR AUTOMATICALLY ANALYZING AN OCR FRAME FOR PRODUCT SEARCH," co-pending U.S. patent application Ser. No. 13/688,772, filed Nov. 29, 2012, entitled "HIGH PERFORMANCE OCR SOLUTION FOR AUGMENTED REALITY APPLICATIONS," co-pending U.S. patent application Ser. No. 14/105,028, filed Dec. 13, 2014, entitled "COLLABORATIVE TEXT DETECTION AND RECOGNITION," and co-pending U.S. patent application Ser. No. 13/842,433, filed Mar. 15, 2013, entitled "SEMI-STRUCTURED TEXT ENTITY RECOGNITION FROM NATURAL SCENE IMAGES," which are hereby incorporated herein by references in their entirety.

Figure 3F:
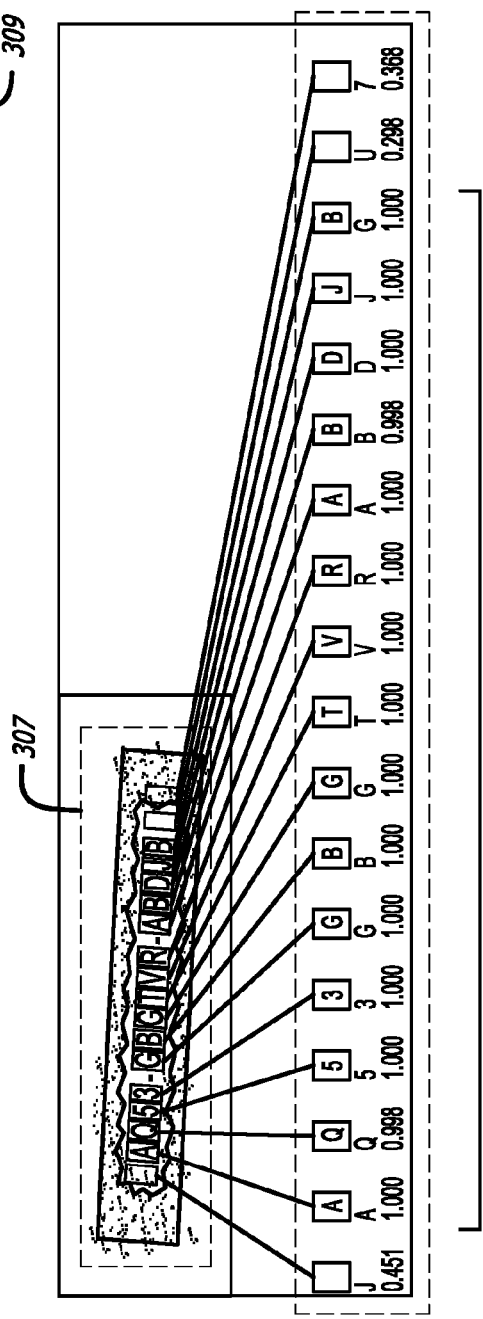

At search for claim code 212, claim code characters can be determined from a substring of the recognized claim code characters. Each character in the substring has a confidence score at least above a threshold confidence score. In some implementations, claim codes of a gift card from a specific entity may have certain predefined patterns (e.g., the first two characters starts with "AQ" or "AS", or claim codes have a predetermined length of characters) and/or at least one checksum character. The predefined patterns may be determined based upon at least a specific theme of the gift card, or entity issued the gift card and can be used in determining the substring of recognized claim code characters. In some embodiments, a checksum character in determined claim codes is used to verify whether the determined claim codes are valid claim codes of a corresponding gift card. If determined claim code characters have confidence scores above the threshold value, matching patterns of a corresponding type of gift card, and passing a corresponding checksum, the determined claim codes can be provided on a user interface for a user to apply or confirm. FIG. 3F illustrates an example of a substring claim code characters 310 that are selected from the recognized claim code characters 307. In this example, recognized characters in the substring 310 all have substantially high confidence scores, which are equal to or close to 1.0. If the substring "AQ53GBGTVRABDJB" 310 also passes a corresponding checksum, the substring 310 can be considered as a valid claim code.

Figure 4:
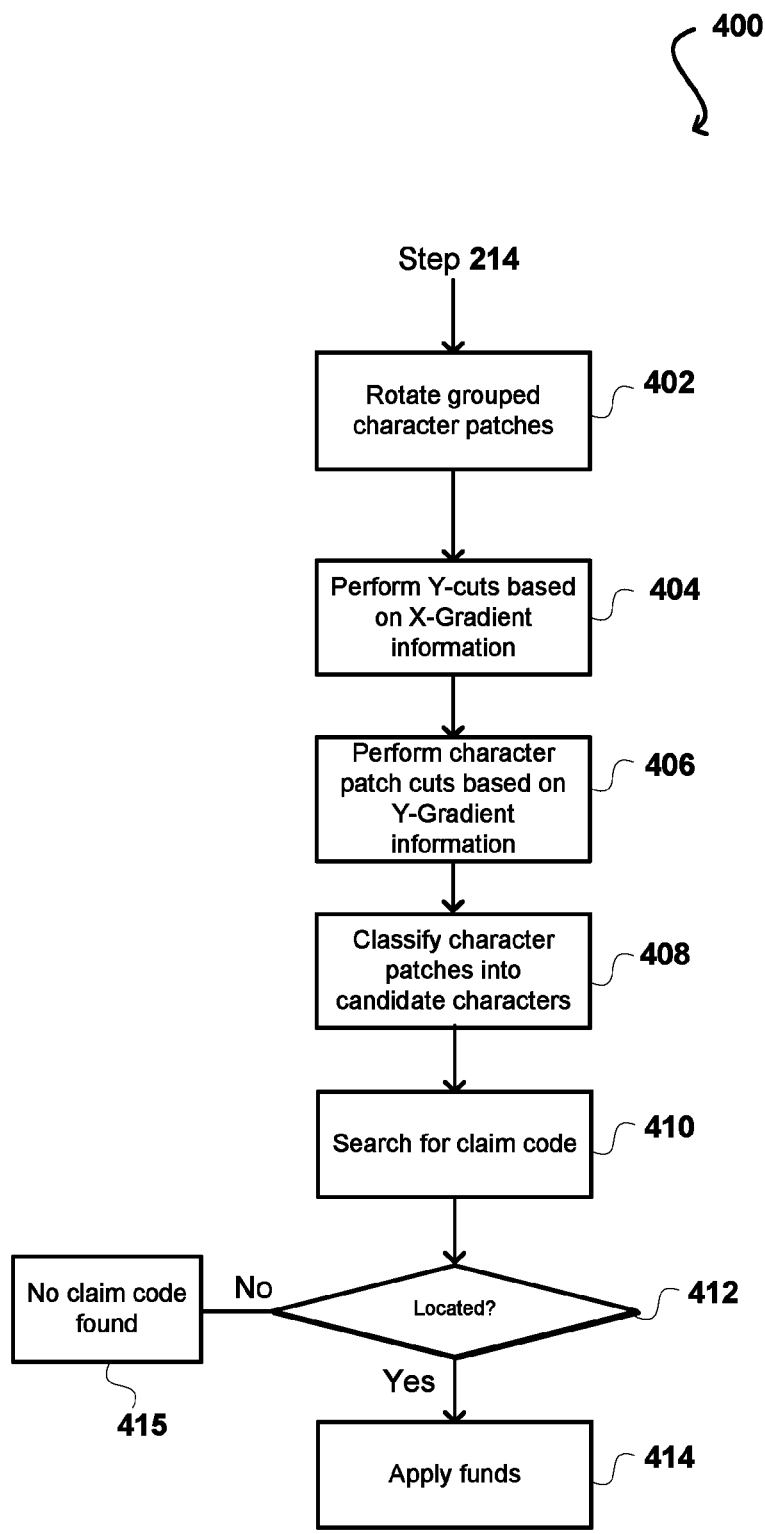
FIG. 4 illustrates an example of a flow diagram illustrating character recognition subtasks of a second-pass pipeline for recognizing claim codes of a gift card in accordance with various embodiments.

In response to a successful verification of the plurality of claim code characters, the user can apply or access funds associated with the gift card at 216. In some instances, claim codes of the gift card cannot be found by character recognition subtasks of the first-pass pipeline 200. Processed data from the first-pass pipeline can then be used 214 as input data in subtasks of a second-pass pipeline for recognizing claim codes of the binarized image. FIG. 4 illustrates an example of a flow diagram illustrating character recognition subtasks of a second-pass pipeline 400 for recognizing claim codes of a gift card in accordance with various embodiments. In some embodiments, subtasks of the second-pass pipeline are used to decompose recognized characters in the first-pass pipeline into rectangular unites (RUs). A RU is the minimum bounding rectangle of a set of recognized characters or connected characters, and is the smallest unit of a received image, which may contain a portion, a whole or more than one claim code character up to the entire claim code.

Figure 5A:
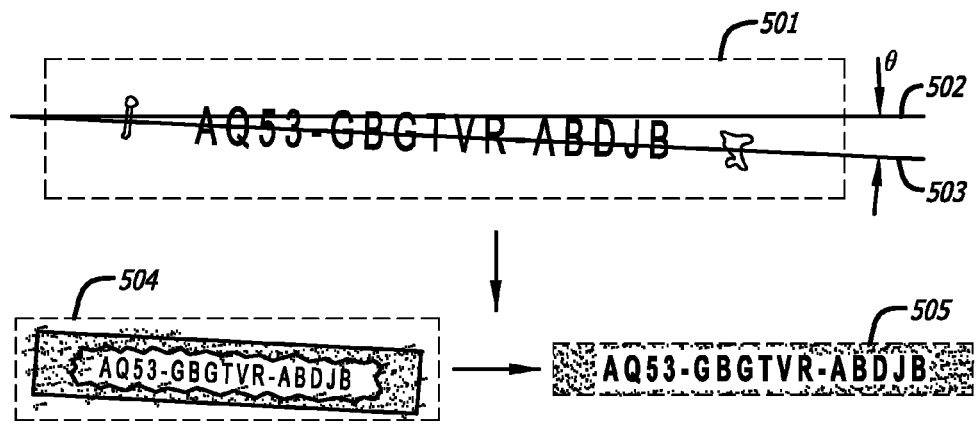
FIGS. 5A-5D illustrate examples of character recognition subtasks in a second-pass process for recognizing claim codes in a received image in accordance with various embodiments.

At 402, grouped character patches from the first-pass pipeline can be rotated to determine a new baseline for the grouped character patches. In some embodiments, a baseline of the grouped character patches can be assumed to be a specific line that contains the highest number of contour pixels in binarized images of the recognized characters. The binarized images of the recognized characters can be warped to level with the baseline of the grouped character patches, which can be assumed a horizontal line. FIG. 5A illustrates an example of rotating grouped character patches in the binarized image 501 of claim code characters. In this example, the binarized image of grouped character patches 504 was leveled along an old baseline 502. A new baseline 503 can be determined by rotating the grouped character patches 504 counter-clockwise θ degrees. The binarized image of grouped character patches 504 can then be warped to level with the new baseline 503, as illustrated by the grouped character patches 505.

Figure 5B:
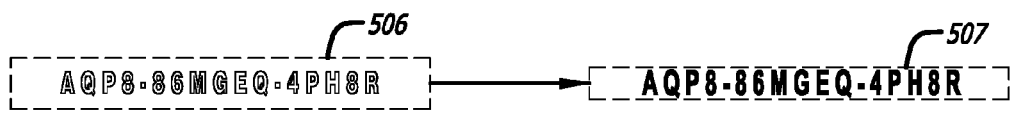

Based on X-Gradient information of the grouped character patches along the new baseline, top and bottom positions of the grouped character patches can be determined for a close Y-Cut 404. An example of a close Y-Cut is illustrated in FIG. 5B. In this example, top and bottom positions of the grouped character patches 506 can be determined based on X-Gradient information of character patches 506. A close Y-Cut can then be performed along the top and bottom of the grouped character patches to come up with grouped character patches 507.

Figure 5C:
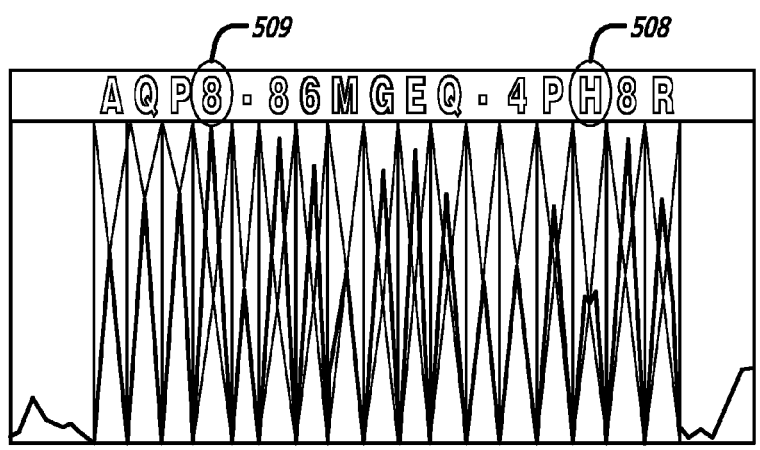

Based on Y-Gradient information of the grouped character patches, regions of the grouped character patches can be determined for a close character patch cut (i.e., X-Cut) 406. In some embodiments, a close character patch cut can be done in two steps. The first step is to determine regions for a clean cut. Clean cut regions may have a pattern of valley-peak-valley, within which valleys are at a substantially similar level and peaks at substantially higher level. For instances, assuming valleys and peaks between 0 and 100, clean cut regions may have valleys equal or less than a predetermined valley value (e.g., 30) while peaks equal or more than a predetermined peak value (e.g., 70). For instances, a grouped character patch that has a pattern of valley-peak-valley with values 20-80-22 may meet the requirement of clean-cut regions. In some implementations, determined clean-cut regions can be used to determine a size of character patch cuts. For instances, each character has a width roughly with a fixed number of pixels (e.g., 20) in the clean-cut regions. In the second step, the width of characters in non-clean-cut regions can be compared with that of the clean-cut regions. If the width of a specific character in non-clean-cut regions is similar to that of the clean-cut regions, a close character patch cut can be performed on the specific character. An example of peaks and valleys corresponding to the grouped character patches is illustrated in FIG. 5C. In this example, some characters do not have peaks and valleys that meet the clean-cut requirement in the first step. For instances, the character "H" 508 has a pattern of valley-peak-valley that may not meet the requirement of clean-cut regions. However, the width of the character "H" 508 is similar to that of the clean-cut regions (e.g., character "8" 509). A close character patch cut can be performed on the character "H" 508.

Various approaches can be used to determine Y-Cut and X-Cut for the grouped character patches in a binarized image. In some embodiments, the binarized image can be segmented, recursively, by X-Cut and Y-cut from large components (e.g., starting with the entire image to small components), and eventually reaching individual characters. For instances, background pixels can be processed and then white space in the binarized image can be used to identify homogeneous regions. Suitable approaches may include, but are not limited to, X-Y tree, pixel-based projection profile, connected component-based projection profile, white space tracing, and white space thinning. In some embodiments, homogeneous regions of the binarized image can grow from small components based on the processing on pixels and connected components. Examples of this approach may include the Doctrum method, which uses k-nearest neighbor clustering.

In some embodiments, the binarized image can be segmented based on character-like properties. The binarized image can be dissected by analyzing the image without using a specific class of shape information. Suitable methods of dissecting the binarized image may include, but are not limited to, white space and pitch, vertical projection analysis, connected component analysis, and landmarks. In some embodiments, the binarized image can be dissected by using recognition confidence, which includes syntactic or semantic correctness of the overall result.

Figure 5D:
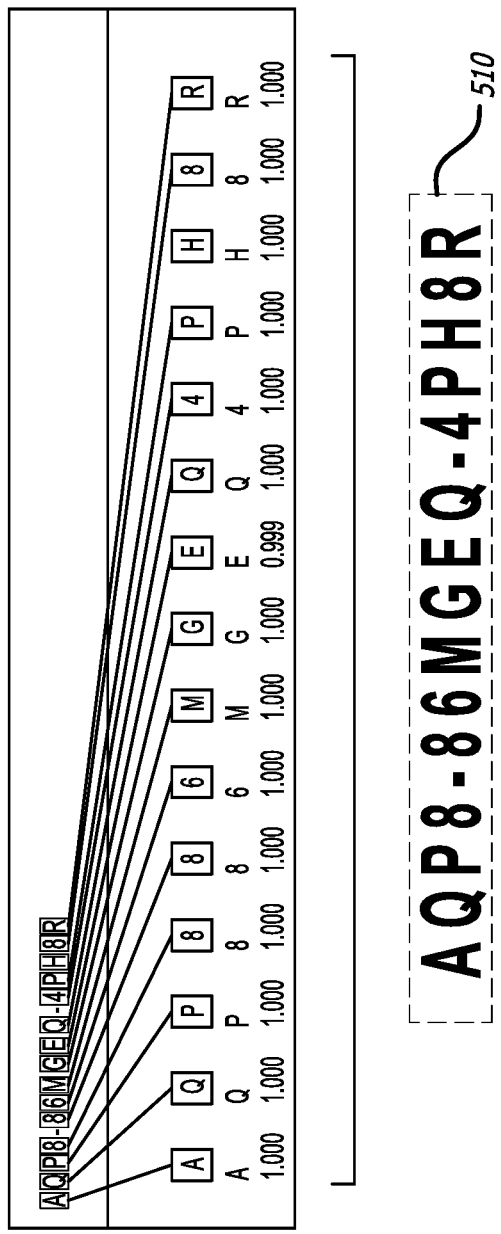

At classify characters 408, character patches can be classified into claim code characters by using one or more machine learning algorithms. At search for claim code 410, claim code characters can be recognized from classified claim code characters by using the one or more machine learning algorithms. FIG. 5D illustrates an example of recognized claim code characters 510 that are determined from classified character patches. In this example, the recognized claim code characters, "AQP8-86MGEQ-4PH8R" 510, all have substantially high confidence scores, which are equal to or close to 1.0.

A determination can be made 412 on whether claim code of the gift card has been located and verified. In response to a successful verification of the plurality of claim code characters, funds associated with the gift card can be applied or accessed at 414. In some instances, in response to the claim code of the gift card not being found, a notification can be provided on a user interface that no claim code can be found 415.

In some embodiments, multiple images of a gift card can be used to come up with multiple sets of recognized claim codes. Different sets of claim codes can be compared to determine whether any of the claim codes is inconsistent. In some implementations, confidence scores of different sets of claim codes can be compared as well to determine whether confidence scores of recognized claim code characters are consistent high over time.

Figure 6:
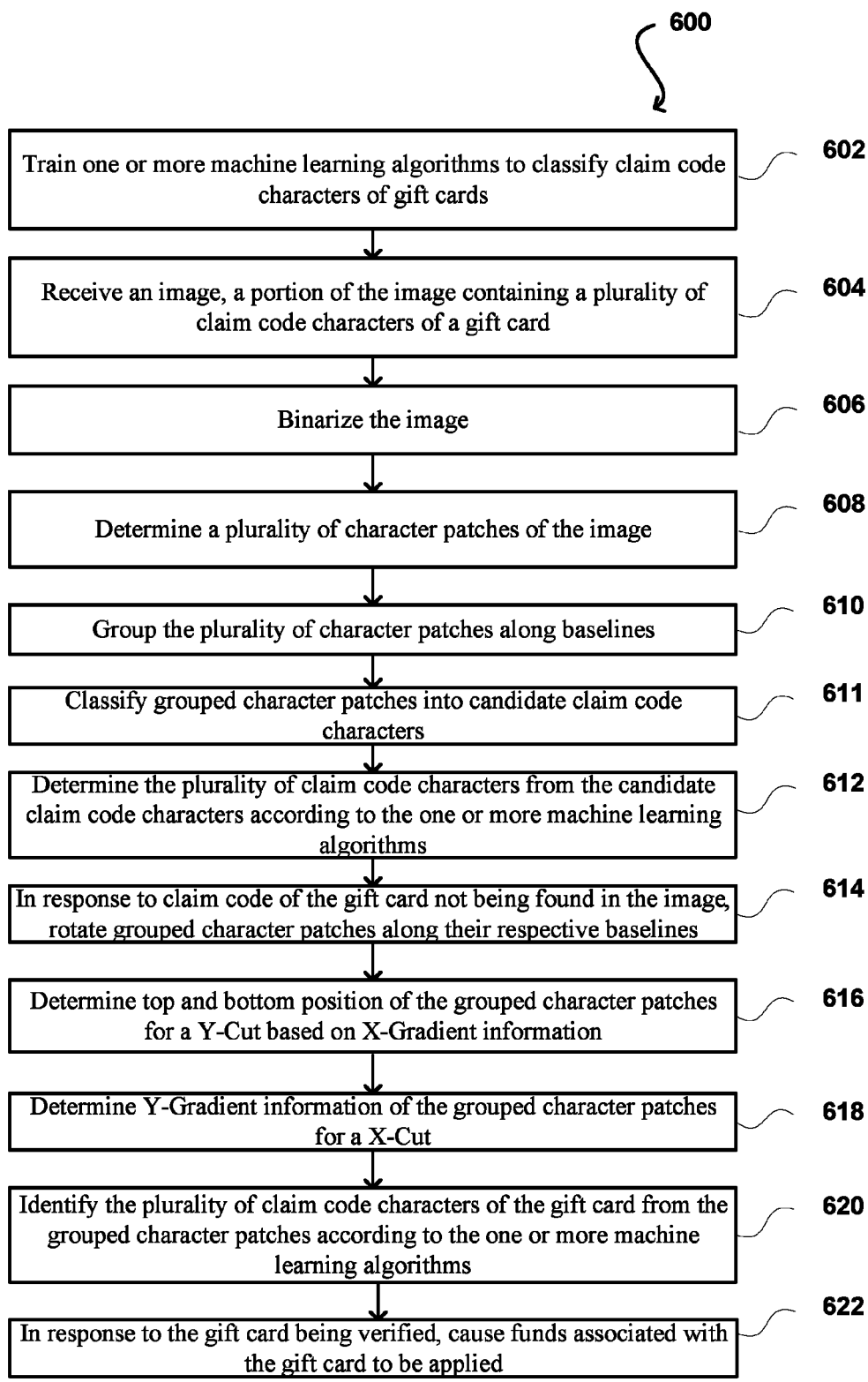
FIG. 6 illustrates an example process for recognizing claim codes in a received image of a gift card that can be utilized in accordance with various embodiments.

FIG. 6 illustrates an example process for recognizing claim codes from a received image that can be utilized in accordance with various embodiments. The example method embodiment 600 starts with training one or more machine learning algorithms to classify collected claim code characters of gift cards, at step 602. In some embodiments, images of these collected claim codes may be captured with various lighting, positions and noises (e.g., from scratched-off coding material), and have various appearances (e.g., fonts, heights, thickness, spacing and sizes). In response to a new set of claim code samples being collected, the one or more machine learning algorithms can process the new set of claim code samples to readjust and refine relevant parameters in the machine learning models. In some embodiments, training of the one or more machine learning algorithms may include one or more various template matching, statistical techniques, structural techniques and neural networks.

At step 604, an image containing a plurality of claim code characters of a gift card is received. The image may be a particular region of the gift card containing claim code or an entire image of the gift card. The image is binarized such that the image is suitable for character detection processing, at step 606. In some embodiments, the image is binarized by saturating the image with a fixed value and then running an adaptive threshold and optional dilate and arode stage on saturated image.

At 608, a plurality of character patches can be determined in binarized image. It should be understood that a variety of character detection techniques may be used in selecting character patches in the binarized image. For example, selected characters patches may include, but are not limited to, maximally stable extremal regions (MSERs), Harris-affine regions, Hessian-affine regions, Kadir-Brady saliency (KBS) regions, edge-based regions (EBR) regions, and intensity extrema and salient regions. At 610, selected character patches are group along their corresponding baselines. In some embodiments, the baselines are determined by one or more line finding algorithms and used to group selected character patches. A baseline of a grouped character patches can be assumed to be a specific line that contains the highest number of contour pixels. In some embodiments, character patches having similar sizes or aspect ratios and along a specific baseline can be grouped together into a particular group of character patches.

Grouped character patches in the binarized image can be classified into candidate claim code characters by using the one or more machine learning algorithms, at step 611. In some embodiments, one or more neural network models can be used to classify grouped character patches into grouped claim code characters. In some embodiments, a convolutional neural network can be used to classify grouped character patches into claim code characters. In some embodiments, classifying the grouped character patches may include extracting features from each grouped character patches. At step 612, the plurality of claim code characters of the gift card can be recognized according to the one or more machine learning algorithms. In some embodiments, each recognized claim code character may be associated with a confidence score. The confidence score may be a probability associated with the accuracy of the recognized character according to the one or more machine learning algorithms.

At step 614, in response to claim code of the gift card not being found in the image, grouped character patches can be rotated to determine a new baseline for the grouped character patches. Binarized images of the grouped character patches can then be warped to level with the new baseline. Top and bottom positions of the grouped character patches can be determined for a close Y-Cut based on X-Gradient information of the grouped character patches along the new baseline, at step 616.

Based on Y-Gradient information of the grouped character patches, regions of the grouped character patches can be determined for a close X-Cut, at step 618. In some embodiments, a close X-Cut can be done in two steps. The first step is to determine regions for a clean cut. In the second step, the width of characters in non-clean-cut regions can be compared with that of the clean-cut regions. If the width of a specific character in non-clean-cut regions is similar to that of the clean-cut regions, a close character patch cut can be performed on the specific character.

At step 620, the one or more machine learning algorithms can be used to classify the grouped character patches into claim code characters and identify the plurality of claim code characters of the gift card. In response to a successful verification of the plurality of claim code characters, funds associated with the gift card can be applied or accessed at step 622.

Figure 7:
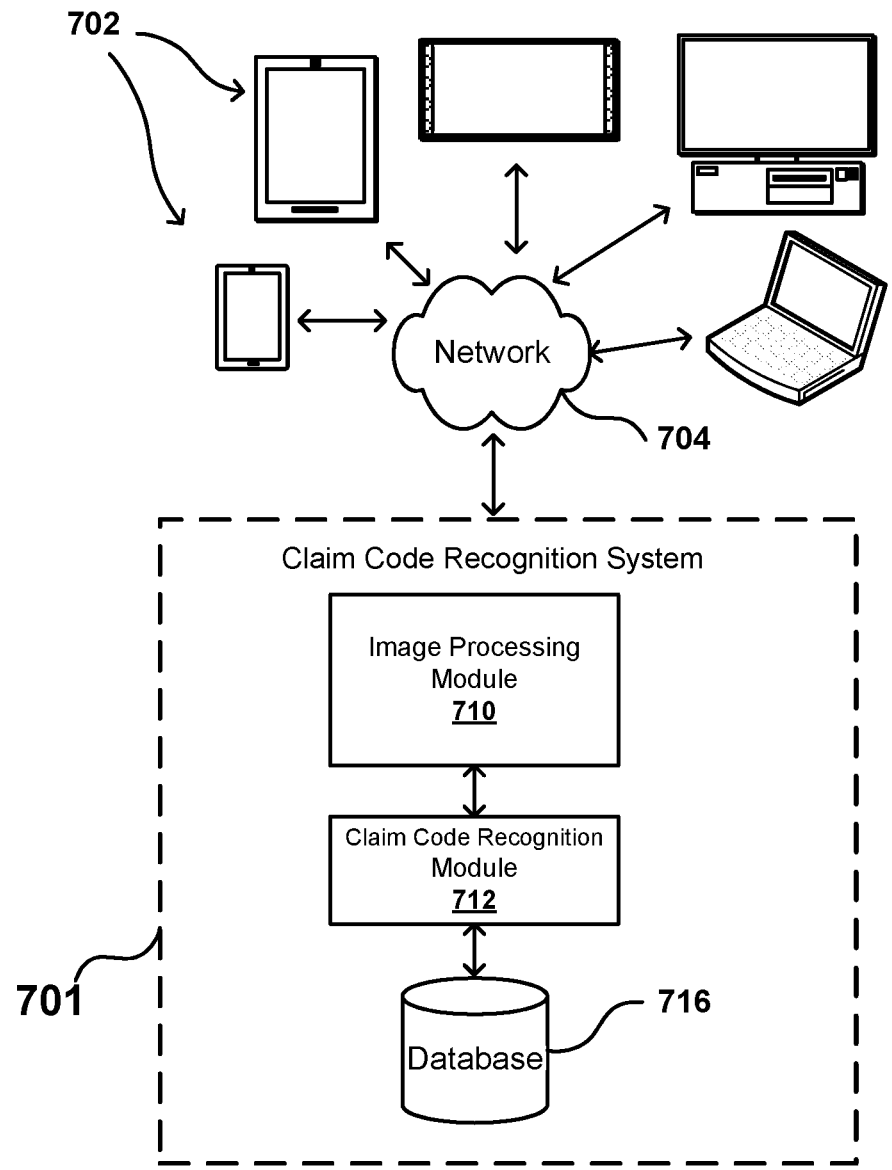
FIG. 7 illustrates an example of a system for recognizing claim codes of gift cards in accordance with various embodiments.

FIG. 7 illustrates an example of an environment 700 in which various aspects of the embodiments can be implemented and/or utilized. It should be understood that the example system is a general overview of basic components, and that there can be many additional and/or alternative components utilized as known or used in the art for identifying characters in one or more images. In this example, a user is able to utilize a computing device 702, such as a personal computer, tablet computer, smart phone, and the like, to access a Claim Code Recognition System (e.g., an OCR system) or service 701 over at least one wired and/or wireless network 704, such as the Internet, an Intranet, a cellular network, a local area network (LAN) and the like, for communicating digital information. The computing device 702 can capture or receive one or more images (or video) of gift cards and cause the images to be sent to the Claim Code Recognition System 701 over the at least one appropriate network 704. The Claim Code Recognition System 701 includes an image-processing module 710 that can apply different operators or techniques to pre-process the images before submitting the images to one or more claim code recognition modules 712. Examples of the operators include a Laplacian-of-Gaussian filter, thresholding filters, and so forth, which enhance or mitigate different characteristics of the images. Examples of these characteristics include intensity, blurriness, and so forth. After pre-processing, the one or more claim code recognition modules 712 can recognize claim code characters from the image to produce recognized claim code of the gift card. In at least one embodiment, a processor can analyze the recognized claim code using a database 716 of claim codes in order to improve the recognition. The database 716 includes a set of claim codes which the processor can search for matches corresponding to claim codes present in the recognized text. At least a portion of these tasks can be performed on a portable computing device or by using at least one resource available across a network as well. In at least some embodiments, a claim codes recognition application (e.g., an OCR application) can be installed on the computing device 702, such that much of the processing, analyzing, or other such aspects can be executed on the computing device. Various processing steps can be performed by the computing device 702, by the Claim Code Recognition System 701, or a combination thereof. Therefore, it should be understood that the components and capabilities of the Claim Code Recognition System 701 could wholly or partly reside on the computing device 702. In some embodiments, various processing steps can be implemented in one or more flow state engines and/or one or more core device-side computer vision engines of the Claim Code Recognition System 701, and/or other mobile applications.

In some embodiments, the computing device 702 is a portable computing device and the Claim Code Recognition System 701 is a server such as an application server, a web server, etc. The portable computing device may include a camera, an interface (e.g., a display element) that displays the field of view of the camera, and a processing component. The camera can include a lens and an image sensor that converts an optical image into an electrical signal. The portable computing device can capture images in different directions and the interface can display captured images. The processing component processes the captured images to detect claim codes in the images. For example, the processing component can implement algorithms that detect and recognize one or more regions of the image covered by claim code characters. The one or more image regions may be cropped to create one or more regions with cropped claim code characters. The one or more regions of cropped claim code characters can be binarized and be further processed on the portable computing device. In some other embodiments, the one or more regions of cropped claim code characters can be sent to the server for further processing. In some instances, a grey scale image, color image or any other image (cropped or otherwise not cropped) can be sent to the server (or remain on the portable computing device) for further processing.

FIGS. 8A and 8B illustrate front and back views, respectively, of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices are capable of receiving, displaying or playing streaming media files in accordance with various embodiments discussed herein. The devices can include, for example, desktop PCs, laptop computers, tablet computers, personal data assistants (PDAs), smart phones, portable media players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, among others.

In this example, the computing device 800 has a display screen 802 (e.g., an LCD element) operable to display information or image content to one or more users or viewers of the device. The display screen of some embodiments displays information (e.g., streaming media file) to the viewer facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one computing mechanism 814, such as may include at least one wired or wireless component operable to communicate with one or more electronic devices. The device also includes a power system 816, such as may include a battery operable to be recharged through al plug-in approaches, or through other approaches such as capacitive charging through proximity with a power mat or other such device. Various other elements and/or combinations are possible as well within the scope of various embodiments.

FIG. 9 illustrates a set of basic components of an electronic computing device 900 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of computing approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers. The display element 906 is capable of displaying streaming media files or other information to viewers facing the display element 906.

As discussed, the device in many embodiments will include at least one imaging/audio element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation/motion determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device. In some embodiments, the example computing device 900 may also include a low power, low resolution imaging element to capture image data. The low resolution imaging element can transmit the captured image data over a low bandwidth bus, such as an I2C bus, to a low power processor, such as a PIC-class processor. The PIC processor may also communicate with other components of the computing device 900, such as Orientation Motion Element 910, etc. The PIC processor can analyze the image data from the low resolution imaging element and other components of the computing device 900 to determine whether the head motion likely corresponds to a recognized head gesture. If the PIC processor determines that the head motion likely corresponds to a recognize head gesture, the PIC processor can enable other image element to activate high resolution image capture and/or main processor to analyze the capture high resolution image data.

The example device also includes one or more wireless components 914 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more al wired communications connections as known in the art.

The device also includes a power system 916, such as may include a battery operable to be recharged through al plug-in approaches, or through other approaches such as capacitive charging through proximity with a power mat or other such device. Various other elements and/or combinations are possible as well within the scope of various embodiments.

In some embodiments the device can include at least one additional input device 718 able to receive al input from a user. This al input can include, for example, a push button, touch pad, touch screen, wheel, joystick, keyboard, mouse, keypad, or any other such device or element whereby a user can input a command or a request for additional product information to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 10:
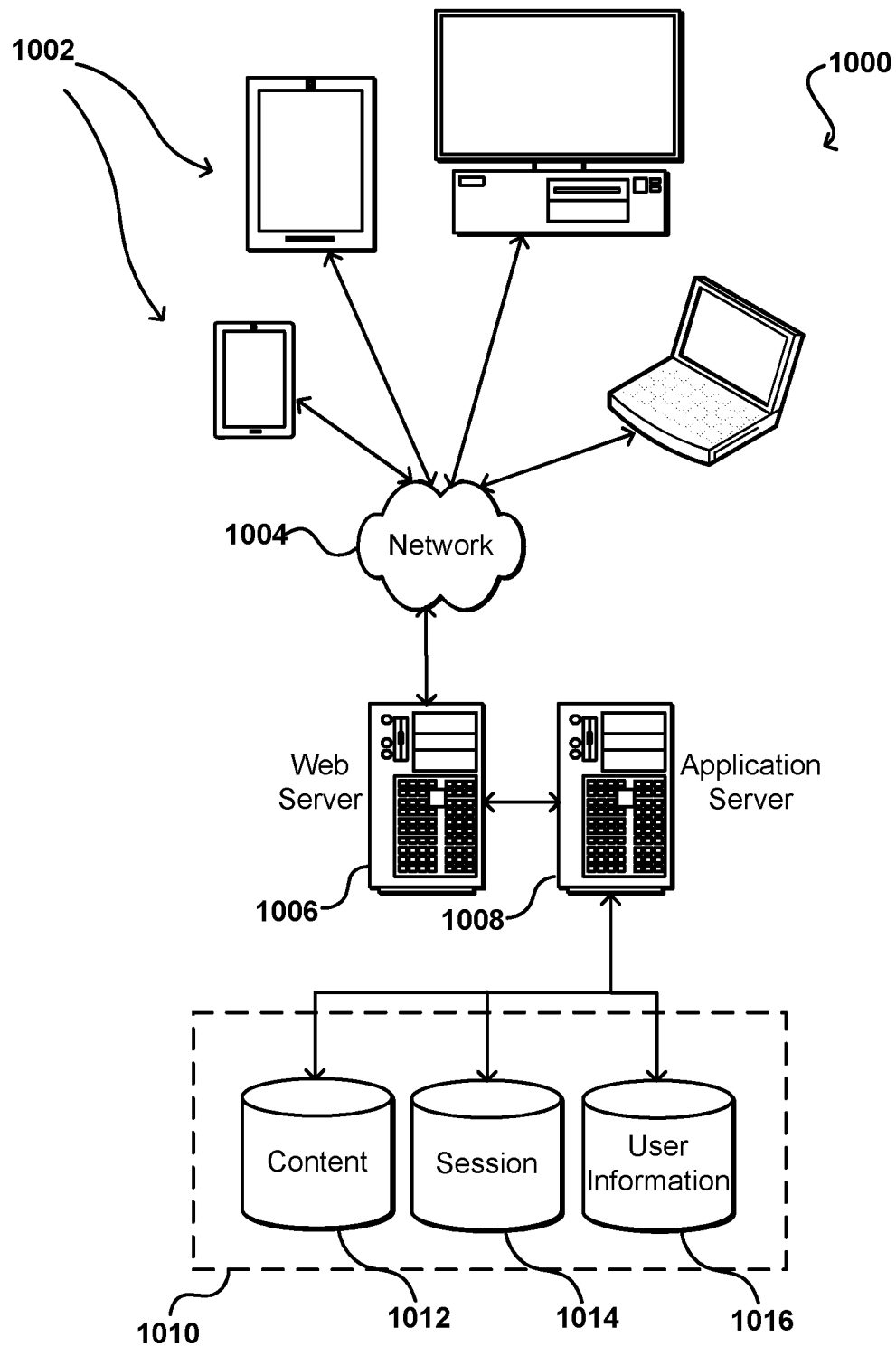
FIG. 10 illustrates an environment in which various embodiments can be implemented in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic computing device 1002, which can include any appropriate device operable to send and receive requests, messages or information over an appropriate network 1004 and convey information back to a user of the device. Examples of such computing devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the computing device. In a "pull" network, one or more of the servers send data to the computing device upon request for the data by the computing device. Components used for such a system can depend at least in part upon the type of network and/or environment selected.

Protocols and components for communicating via such a network are well known and will not be discussed herein in detail. Computing over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the computing device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the computing device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The user information 1016 may include user preference, historical data, user demographic data, and audio system of the user devices associated with users. Demographic data of users may include user age, user gender, user educational background, user marital status, user income level, user ethnicity, user postal code, user primary language, or user spending habit. The audio system may include headphone (e.g., earphone, ear bud, and the like), speaker (e.g., tablet speaker, blue tooth speaker, computer speaker, bookshelf speaker, center-channel speaker, floor speaker, in-wall and in-ceiling speaker, outdoor speaker, sound bar, portable speaker, and woofer/sub-woofer speaker), or various types of audio amplifiers. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving an image of a gift card, the gift card containing a plurality of claim code characters;
    generating a binarized image of the gift card;
    determining a plurality of character patches of the binarized image;
    grouping the plurality of character patches into one or more grouped character patches;
    performing a first close cut of the one or more grouped character patches based at least upon top and bottom positions of the one or more grouped character patches;
    determining one or more clean-cut regions of the binarized image, wherein the one or more clean-cut regions have a subset of the grouped character patches satisfying a predetermined condition;
    determining a first range of width for grouped character patches in the first subset;
    classifying the one or more grouped character patches into a first set of candidate claim code characters according to the one or more machine learning algorithms based at least in part on the one or more clean-cut regions; and
    identifying the plurality of claim code characters from the first set of candidate claim code characters.

2. The computer-implemented method of claim 1, further comprising:
    determining a first location on the gift card corresponding to the plurality of claim code characters;
    causing the image of the gift card to be displayed on a display of a computing device;
    causing a representation of the plurality of claim code characters identified from the first set of candidate claim code characters to be overlaid on the image proximate to the first location; and
    receiving an indication that the representation of the plurality of claim code characters is approved by a user.

3. The computer-implemented method of claim 2, wherein the indication comprises one of a voice indication received by the computing device, input received by a user interface element displayed on the display, a gesture indication received by the computing device, or a motion of the computing device.

4. The computer-implemented method of claim 1, further comprising:
    assigning, using a trained classifier, a confidence score to each of the first set of candidate claim code characters; and
    in response to a specific candidate claim code character having a corresponding confidence score below a threshold confidence score, remove the specific candidate claim code character in identifying the plurality of claim code characters.

5. The computer-implemented method of claim 1, further comprising:
    verifying the plurality of claim code characters based at least upon a checksum character, where the checksum character is one of the plurality of claim code characters.

6. The computer-implemented method of claim 1, further comprising:

collecting images of claim codes of gift cards captured under at least one of different lighting, positions, or noises, wherein the images of claim codes have at least one of different fonts, heights, thicknesses, spacing, or sizes; and training a classifier using collected images of claim codes based at least upon one or more machine learning algorithms.

7. The computer-implemented method of claim 6, wherein the one or more machine learning algorithms include at least one of machine-learning models comprising: a neural network model, support vector machine based model, Bayesian statistics, case-based reasoning, decision tree, inductive logic programming, Gaussian process regression, linear regression, group method of data handling, learning automata, random forest, ensembles of classifiers, ordinal classification, and conditional random field.

8. The computer-implemented method of claim 7, further comprising:
in response to a new set of images of claim codes of gift cards being collected, processing the new set of images to readjust and refine parameter weights of the neural network model.

9. The computer-implemented method of claim 1, wherein the gift card comprises a physical document containing a code redeemable for a monetary value or credit.

10. The computer-implemented method of claim 1, further comprising:
determining that the plurality of claim code characters identified from the first set of candidate claim code characters do not match the plurality of claim code characters on the gift card;
identifying one or more baselines of the one or more grouped character patches; and
rotating the one or more grouped character patches along the one or more baselines to determine one or more new baselines.

11. The computer-implemented method of claim 1, further comprising:
performing a second close cut on the one or more grouped character patches based at least upon Y-gradient information of the one or more grouped character patches;
classifying the one or more grouped character patches into a second set of candidate claim code characters according to the one or more machine learning algorithms; and
determining the plurality of claim code characters from the second set of candidate claim code characters.

12. The computer-implemented method of claim 11, further comprising:
determining a second subset of grouped character patches, the grouped character patches in the second subset having a second range of width within the first range of width; and
performing the second close cut on the first subset of grouped character patches and the second subset of grouped character patches.

13. The computer-implemented method of claim 1, further comprising:
pre-processing the image of the gift card to determine at least one of: a type of the gift card, a location of the plurality of claim code characters, or regions in the image having a high possibility to find the plurality of claim code characters.

14. The computer-implemented method of claim 13, further comprising:
providing, based upon results of pre-processing the image, a user interface element configured to enable zooming in on a specific region of the gift card.

15. The computer-implemented method of claim 1, further comprising:
receiving a second image containing the plurality of claim code characters of the gift card;
determining a second plurality of claim code characters based on the second image; and
comparing the plurality of claim code characters with the second plurality of claim code characters.

16. The computer-implemented method of claim 1, wherein the binarized image is generated by using one or more binarization methods including an Otsu method, contrast adaptive method, light-weight text image processing method, noise-attribute-thresholding method, threshold selection method, Niblack method, Sauvola method, and Christian method.

17. The computer-implemented method of claim 1, further comprising:
determining spaces between the first set of candidate claim code characters; and
determining one or more claim code boundaries based at least on an identification of specific characters, or an identification of specific gaps between adjacent candidate claim code characters wherein the gaps exceed a threshold gap value.

18. The computer-implemented method of claim 1, further comprising:
verifying the identified plurality of claim code characters; and
enabling funds associated with the gift card to be applied or accessed.

19. A system, comprising:
at least one processor; and
memory including instructions that, when executed by the at least one processor, cause the system to:
receive an image containing a plurality of claim code characters;
binarize the image;
determine a plurality of character patches of the binarized image;
group the plurality of character patches into one or more grouped character patches;
perform a first close cut of the one or more grouped character patches based at least upon top and bottom positions of the one or more grouped character patches;
determine one or more clean-cut regions of the binarized image, wherein the one or more clean-cut regions have a subset of the grouped character patches satisfying a predetermined condition;
determine a first range of width for grouped character patches in the first subset;
classify the one or more grouped character patches into a first set of candidate claim code characters according to the one or more machine learning algorithms based at least in part on the one or more clean-cut regions; and
identify the plurality of claim code characters from the first set of candidate claim code characters.

20. A non-transitory computer-readable storage medium including instructions that, when executed by at least one processor of a computing system, cause the computing system to:
receive an image of a gift card, the gift card containing a plurality of claim code characters;

generate a binarized image of the gift card;
determine a plurality of character patches of the binarized image;
group the plurality of character patches into one or more grouped character patches;
classify the one or more grouped character patches into a first set of candidate claim code characters;
determine that at least a subset of the plurality of claim code characters cannot be identified from the first set of candidate claim code characters;
perform at least one close cut of the grouped character patches to generate one or more second grouped character patches;
determine one or more clean-cut regions of the binarized image, wherein the one or more clean-cut regions have a subset of the grouped character patches satisfying a predetermined condition;
determine a first range of width for grouped character patches in the first subset;
classify the one or more second grouped character patches into a second set of candidate claim code characters according to the one or more machine learning algorithms based at least in part on the one or more clean-cut regions; and
identify the plurality of claim code characters from the second set of candidate claim code characters.

* * * * *